United States Patent
Cottle et al.

(10) Patent No.: US 10,506,410 B2
(45) Date of Patent: Dec. 10, 2019

(54) SYSTEMS AND METHODS FOR ACQUIRING AND PROVIDING INFORMATION ASSOCIATED WITH A CRISIS

(71) Applicant: Facebook, Inc., Menlo Park, CA (US)

(72) Inventors: Peter Michael Cottle, Palo Alto, CA (US); Sharon Zeng, San Francisco, CA (US); Jean Carla Ablaza Echevarria, Brooklyn, NY (US); Jasmine R. Friedl, San Francisco, CA (US); Cameron Chuk Hing Wu, San Francisco, CA (US); Brian Paihan Sa, Irvine, CA (US); Abhishek Parthasarathy, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/593,069

(22) Filed: May 11, 2017

(65) Prior Publication Data

US 2017/0251069 A1    Aug. 31, 2017

Related U.S. Application Data

(63) Continuation of application No. 14/484,166, filed on Sep. 11, 2014, now Pat. No. 9,686,663.

(51) Int. Cl.
| | |
|---|---|
| *G06F 15/16* | (2006.01) |
| *H04W 4/90* | (2018.01) |
| *H04W 4/021* | (2018.01) |
| *G08B 21/10* | (2006.01) |
| *H04L 29/08* | (2006.01) |

(52) U.S. Cl.
CPC ............... *H04W 4/90* (2018.02); *G08B 21/10* (2013.01); *H04L 67/10* (2013.01); *H04L 67/18* (2013.01); *H04L 67/24* (2013.01); *H04W 4/021* (2013.01)

(58) Field of Classification Search
None
See application file for complete search history.

(56) References Cited

U.S. PATENT DOCUMENTS

| | | | | |
|---|---|---|---|---|
| 7,817,982 | B1 * | 10/2010 | Chu | G08B 27/006 |
| | | | | 379/45 |
| 2005/0085257 | A1 * | 4/2005 | Laird | A61B 5/04 |
| | | | | 455/550.1 |
| 2006/0136291 | A1 * | 6/2006 | Morita | G06Q 30/02 |
| | | | | 705/13 |
| 2008/0183828 | A1 | 7/2008 | Sehgal | |
| 2010/0205037 | A1 * | 8/2010 | Besehanic | G06Q 30/02 |
| | | | | 705/7.34 |
| 2010/0262367 | A1 | 10/2010 | Riggins | |
| 2010/0299615 | A1 * | 11/2010 | Miluzzo | H04W 4/02 |
| | | | | 715/752 |

(Continued)

*Primary Examiner* — Phuoc H Nguyen
(74) *Attorney, Agent, or Firm* — Sheppard Mullin Richter & Hampton LLP

(57) ABSTRACT

Systems, methods, and non-transitory computer-readable media can determine a geographical area associated with a crisis. A first user within the geographical area can be identified based on locational data associated with the first user. Information about a safety status of the first user can be actively requested or acquired from the first user. The safety status of the first user can be broadcasted, communicated, or provided to at least a second user associated with the first user.

20 Claims, 11 Drawing Sheets

(56) References Cited

U.S. PATENT DOCUMENTS

| | | | |
|---|---|---|---|
| 2012/0066139 A1* | 3/2012 | Guzman | G06Q 10/10 |
| | | | 705/319 |
| 2013/0066964 A1 | 3/2013 | Odio | |
| 2013/0196677 A1* | 8/2013 | Smith | H04W 72/10 |
| | | | 455/452.1 |
| 2014/0143351 A1 | 5/2014 | Deng | |
| 2015/0111524 A1* | 4/2015 | South | H04W 4/90 |
| | | | 455/404.2 |
| 2015/0269700 A1* | 9/2015 | Miasnik | G06Q 50/265 |
| | | | 705/325 |

* cited by examiner

SYSTEMS AND METHODS FOR ACQUIRING AND PROVIDING INFORMATION ASSOCIATED WITH A CRISIS

CROSS-REFERENCE TO RELATED APPLICATIONS

This application is a continuation of U.S. patent application Ser. No. 14/484,166, filed on Sep. 11, 2014 and entitled "Systems and Methods for Acquiring and Providing Information Associated with a Crisis", which is incorporated herein by reference in its entirely.

FIELD OF THE INVENTION

The present technology relates to the field of communicating information. More particularly, the present technology relates to techniques for acquiring and providing information associated with a crisis.

BACKGROUND

Today, people utilize computing devices (or systems) for various purposes. Users can use their computing devices to interact with one another, access content, share content, and create content. For example, a user of a social networking system (or service) can utilize his or her computing device to view, access, provide, or otherwise interact with information via the social networking system. However, in the event of a crisis, information can be very important, but difficult to find and access. For example, if a particular user is suspected to be in the vicinity where a crisis or emergency situation is occurring, friends or other social connections of the particular user may be concerned about the particular user and may wish to obtain information about him or her.

Under conventional approaches, the particular user typically has to manually access his or her social networking system account and proactively choose to publish information about himself or herself, in order for the friends or social connections to find out whether he or she is okay. In some cases, this can be inconvenient, inefficient, or ineffective. Moreover, users can forget to log into their social networking system accounts to publish information about themselves during crisis situations. Furthermore, in some cases, even published information can be difficult to find and access, due in part to the large amount of content available at the social networking system. As such, conventional approaches can create challenges for or reduce the overall user experience associated with communicating information during a crisis or emergency situation.

SUMMARY

Various embodiments of the present disclosure can include systems, methods, and non-transitory computer readable media configured to determine a geographical area associated with a crisis. A first user within the geographical area can be identified based on locational data associated with the first user. Information about a safety status of the first user can be requested or acquired from the first user. The safety status of the first user can be broadcasted, communicated, or provided to at least a second user associated with the first user.

In an embodiment, the identifying of the first user within the geographical area can further comprise identifying a set of users who are refreshing web feed data. Respective locational data associated with each user in the set of users can be acquired. The first user can be identified out of the set of users as being at a location corresponding to the geographical area. In some cases, the first user can be identified as being at the location based on the locational data associated with the first user.

In an embodiment, a set of users associated with the first user can be identified. The set of users can include the second user. It can be determined that the second user is within the geographical area. Information about a safety status of the second user can be requested from the second user. The safety status of the second user can be provided to at least a third user associated with the second user.

In an embodiment, the third user can correspond to at least one of the first user or another user different from the first user and the second user.

In an embodiment, it can be determined that the second user is within the geographical area. Information about a safety status of the second user can be received from the first user.

In an embodiment, the second user can be notified that the information about the safety status of the second user has been received from the first user. A confirmation or a non-confirmation for the information about the safety status of the second user can be requested from the second user.

In an embodiment, the determining of the geographical area associated with the crisis can further comprise acquiring at least one of governmental information indicating that the geographical area is associated with the crisis, information from one or more scientific instruments indicating that the geographical area is associated with the crisis, information from one or more private third-party sources indicating that the geographical area is associated with the crisis, information from one or more news sources indicating that the geographical area is associated with the crisis, information from one or more feeds indicating that the geographical area is associated with the crisis, or manual input specifying that the geographical area is associated with the crisis.

In an embodiment, the geographical area can include at least one of a district, a zip code area, a city, a county, a region, a state, a province, or a country.

In an embodiment, the determining of the geographical area associated with the crisis cam include determining that the geographical area is currently associated with the crisis. In some cases, the identifying of the first user within the geographical area can include identifying the first user as being currently within the geographical area. In some instances, the locational data associated with the first user can include current locational data associated with the first user.

In an embodiment, a random probability metric can be generated. A third user can be identified when the random probability metric at least meets a specified probabilistic threshold level. The third user can be associated with the first user and be outside the geographical area. A fourth user who is associated with the third user and who is within the geographical area can be identified. Information about a safety status of the fourth user can be request from the fourth user. The safety status of the fourth user can be provided to at least a fifth user associated with the fourth user.

In an embodiment, the specified probabilistic threshold level can be adjustable.

In an embodiment, information associated with the crisis can be provided to the first user. In some cases, the information associated with the crisis can include at least one of information about food, information about water, information about shelter, information about evacuation, or a warning associated with the crisis.

In an embodiment, the requesting of the information about the safety status of the first user can be performed via at least one of website communications, application communications, text messaging, email messaging, or telephone communications.

In an embodiment, the providing of the safety status of the first user to the at least the second user associated with the first user can further comprise providing a notification to the second user. In some instances, the notification can indicate the safety status of the first user and safety statuses of other social connections associated with the second user.

In an embodiment, the notification can be provided in real-time, at one or more specified time periods, or when an amount of new safety statuses satisfies a threshold amount level.

In an embodiment, the notification can be provided independently of at least one of a location of the second user or the safety status of the second user.

In an embodiment, the second user can be provided with access to at least one of a first set of social connections having confirmed safety statuses or a second set of social connections yet to have confirmed safety statuses. In some cases, the first set can include the first user.

In an embodiment, access to one or more user interactions associated with the safety status of the first user can be provided. In some instances, the one or more user interactions can include at least one of a comment, a message, a like, a tag, or a share.

Many other features and embodiments of the invention will be apparent from the accompanying drawings and from the following detailed description.

Figure 1:
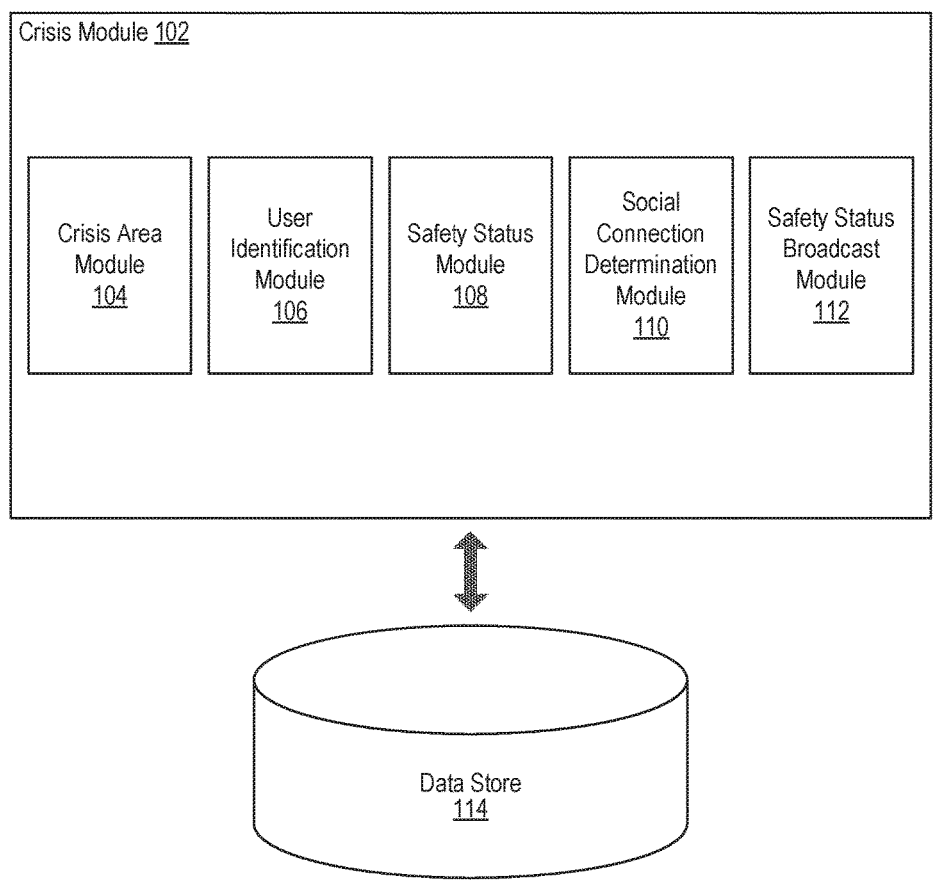
FIG. 1 illustrates an example system including an example crisis module configured to facilitate acquiring and providing information associated with a crisis, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Acquiring and Providing Information Associated with a Crisis

People use social networking systems (or services) for a wide variety of purposes. Users of a social networking system can utilize their computing devices (or systems) to establish connections, communicate, and interact with one another via the social networking system. Users can also provide, share, or access information such as their current whereabouts, places they are visiting, people they are with, and various other information. In one example, a user of the social networking system can publish or post a status message indicating where he or she is and how he or she is doing. In another example, the user can view or access other status messages published or posted by the user's social connections or friends.

In some cases, a crisis or an emergency situation can arise. During crises or emergency situations, it can often be challenging to communicate information. Under conventional approaches, if a particular user desires to share information about his or her safety to others via the social networking system, then he or she typically has to log into the social networking system, write a message, and then publish or post the written message. Often times during crises or emergency situations, the user can forget to convey his or her own safety information for others to view or access. Moreover, even when the user does publish his or her safety information, the information can get filtered out, blocked, or otherwise not be readily accessible to one or more friends or social connections of the user. Due to these and other issues, conventional approaches to communicating information during crises can be inconvenient, inefficient, and/or impractical.

Therefore, an improved approach to communicating information during crises can be beneficial for addressing or alleviating various concerns associated with conventional approaches. Various embodiments of the present disclosure can, for example, determine a geographical area associated with a crisis. A first user within the geographical area can be identified based on locational data associated with the first user. Information about a safety status of the first user can be actively requested, acquired, or obtained from the first user. The safety status of the first user can be broadcasted, communicated, or provided to at least a second user associated with the first user. In one example, at least the second user can be informed about the crisis and/or the first user's status by accessing a Crisis Center page within a social networking system, a feed(s) within the social networking system, or a story(ies) within the social networking system. In some instances, one user can also tag or comment with respect to another user in the page, feed(s), and/or story(ies).

FIG. 1 illustrates an example system 100 including an example crisis module 102 configured to facilitate acquiring and providing information associated with a crisis, according to an embodiment of the present disclosure. As shown in the example system 100, the crisis module 102 can include a crisis area module 104, a user identification module 106, a safety status module 108, a social connection determination module 110, and a safety status broadcast module 112. The example system 100 can also include at least one data store 114.

The at least one data store 114 can be configured to store and maintain various types of data. In some implementations, the at least one data store 114 can store information associated with a social networking system (or service), such as the social networking system 930 of FIG. 9. The information associated with the social networking system can include data about users, social connections, social interactions, locations, maps, places, events, groups, posts, media, communications, and various other types of data.

In the event that a crisis or emergency, disaster, catastrophe, etc. occurs, the crisis area module 104 can be configured to determine a geographical area associated with the crisis. In one example, the crisis area module 104 can acquire information, from a governmental organization or entity, indicating that the crisis is affecting a particular geographical area, such as information about a fire burning between A Street and B Street and between 1st Avenue and 2nd Avenue. In another example, the crisis area module 104 can acquire information from one or more scientific instruments indicating that the crisis is affecting the geographical area, such as seismic data about an earthquake's epicenter being in a particular city. In a further example, the crisis area module 104 can acquire or receive manual input specifying that the crisis is affecting the geographical area.

In some implementations, the crisis area module 104 can identify the geographical boundaries of the geographical area affected by the crisis, such as by working in conjunction with the at least one data store 114. For example, in some cases, the crisis area module 104 can acquire information indicating that the crisis is occurring in a district, a zip code area, a city, a county, a region, a state, a province, or a country, etc., and the data store 114 can provide the geographical boundaries of the district, zip code area, city, county, region, state, province, or country, etc. Moreover, in some embodiments, the crisis area module 104 can determine that the geographical area is currently associated with the crisis, such as by making the determination in or near real-time.

The user identification module 106 can be configured to identify a first user within the geographical area based on locational data associated with the first user. In some embodiments, the user identification module 106 can acquire the locational data from a computing device (or system) of the first user. The locational data can include, but is not limited to, at least one of GPS data, WiFi data, cellular triangulation data, radio signal modulation data, and/or locational check-in data. Based on the locational data associated with the first user, the user identification module 106 can determine that the first user is likely within the geographical area associated with the crisis. The user identification module 106 will be discussed in more detail with reference to FIG. 2.

The safety status module 108 can request, acquire, or obtain information about a safety status of the first user, for example, when it is determined that the crisis is occurring and when the first user is identified as likely being within the geographical area affected by the crisis. The safety status module 108 can actively perform operations to request and/or acquire the safety status of the first user from the first user. The safety status module 108 will be discussed in more detail with reference to FIG. 3.

The social connection determination module 110 can be configured to determine one or more social connections of the first user, such as one or more of the first user's friends within the social networking system. In some instances, the social connection determination module 110 can communicate with the at least one data store 114 to determine the one or more social connections of the first user. For example, the social connection determination module 110 can provide an identifier for the first user to the data store 114 and then acquire, from the data store 114, identifiers for the social connections or friends associated with the first user. The social connection determination module 110 will be discussed in more detail with reference to FIG. 4.

In some implementations, a set of users (e.g., social connections, friends) who are associated with the first user within the social network system can be determined. The set of users can include at least a second user. In some cases, the safety status broadcast module 112 can be configured to broadcast, communicate, or provide the safety status of the first user to the at least the second user. In some instances, the safety status broadcast module 112 can broadcast, communicate, or provide the safety status of the first user to the entire set of users associated with the first user (e.g., all of the first user's friends). As such, the safety status of the first user can be readily accessible to the first user's friends. In some instances, the broadcasting or providing of the first user's safety status can be achieved in the form of one or more notifications.

Moreover, in some embodiments, the crisis module 102 can repeat one or more portions of the above-described approach with respect to one or more social connections of the first user. In one example, the crisis module 102 can utilize the social connection determination module 110 to identify the set of users associated with the first user. The set of users can include, but is not limited to, the second user. The crisis module 102 can utilize the user identification module 106 to determine that the second user is within the geographical area. Further, the crisis module 102 can utilize the safety status module 108 to request, from the second user, information about a safety status of the second user. In addition, the crisis module 102 can utilize the safety status broadcast module 112 to broadcast or provide the safety status of the second user to at least a third user associated with the second user. This process can repeat for other users in the set who are associated with the first user and also determined to be within the geographical area of the crisis. In some instances, this process can also repeat for social connections (e.g., the third user) of the second user, and so forth. It is understood that many variations are possible.

Figure 2:
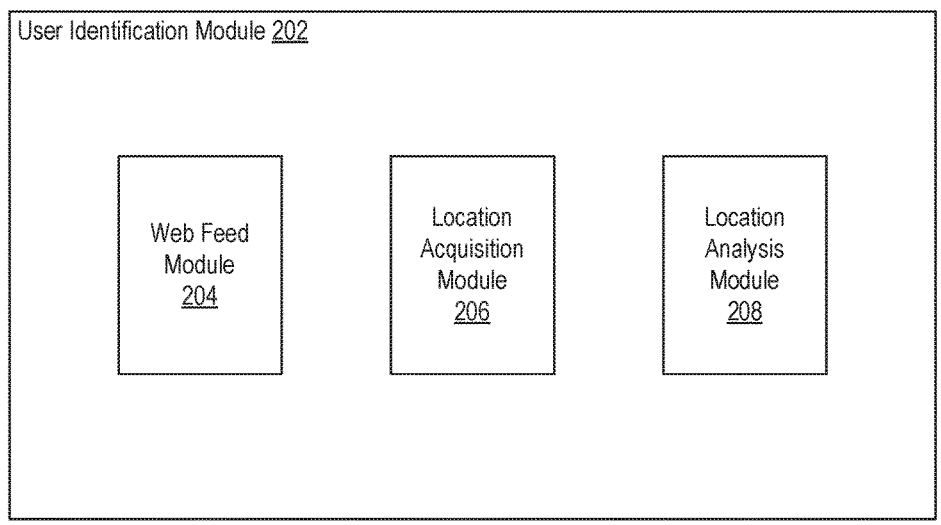
FIG. 2 illustrates an example user identification module configured to facilitate acquiring information during a crisis, according to an embodiment of the present disclosure.

FIG. 2 illustrates an example user identification module 202 configured to facilitate acquiring information during a crisis, according to an embodiment of the present disclosure. In some instances, the example user identification module 202 can be implemented as the example user identification module 106 of FIG. 1. As shown in FIG. 2, the example user identification module 202 can include a web feed module 204, a location acquisition module 206, and a location analysis module 208.

As discussed above, the user identification module 202 can identify the first user within the geographical area based on locational data associated with the first user. In some embodiments, the identifying of the first user can be facilitated by the web feed module 204, the location acquisition module 206, and/or the location analysis module 208. The web feed module 204 can be configured to identify a set of users who are refreshing web feed data. This can be an efficient approach for gathering a sample group of users whose locational data is accessible (as opposed to a less efficient approach such as gathering all users of the social networking system whose locational data is accessible). In some cases, the identifying of the set of users who are refreshing web feed data can be associated with an initialization or trigger to acquire and provide information associated with the crisis. For example, instances of users refreshing their web feed data via an application of the social networking system can cause code for acquiring and providing information associated with the crisis to be run. In some cases, whenever users request information from the application and/or the social networking system, the process of acquiring and providing information associated with the crisis can be initialized or triggered. For example, code for acquiring and providing the information can be run when users open the application, log into the social networking system, send messages, and/or receive messages, etc. It is appreciated that many variations are possible.

In some embodiments, the web feed module 204 can identify a set of users who are currently refreshing news feed data for their social networking system applications running on their respective computing devices (e.g., smartphone, tablets, wearable devices, etc.). The location acquisition module 206 can determine that the users in the set have provided access to their locational data. The location acquisition module 206 can acquire or obtain respective locational data associated with each user in the set of users, assuming the respective locational data is set as being accessible. In some implementations, the location acquisition module 206 can acquire locational data based on each user's Internet Protocol (IP) address (e.g., IP geolocation prediction). Moreover, the locational data can be based on at least one of GPS data, WiFi data, cellular triangulation data, radio signal modulation data, and/or locational check-in data, etc., as discussed above. In some embodiments, the location acquisition module 206 can acquire locational data for a user when the user provides the locational data. In some embodiments, the location acquisition module 206 can acquire locational data for the user without the user having to actively take action. For example, the location acquisition module 206 can receive the locational data from one or more locational sensors (e.g., GPS chip, WiFi transceiver, cellular triangulation system, geolocation system, etc.) of the user's computing device.

Furthermore, the location analysis module 208 can be configured to identify the first user out of the set of users as being at a location corresponding to the geographical area of the crisis. In some cases, the location analysis module 208 can analyze the respective locational data associated with each user in the set of users. The location analysis module 208 can identify the first user as corresponding to a first instance in which locational data for a user (e.g., the first user) indicates that he or she is at a location consistent with, within the boundaries of, or near the geographical area associated with the crisis.

In some implementations, the location acquisition module 206 can acquire current locational data associated with the first user. For example, the location acquisition module 206 can acquire the current locational data associated with the first user in or near real-time. Similarly, in some embodiments, the location analysis module 208 can analyze the locational data associated with the first user in or near real-time.

Figure 3:
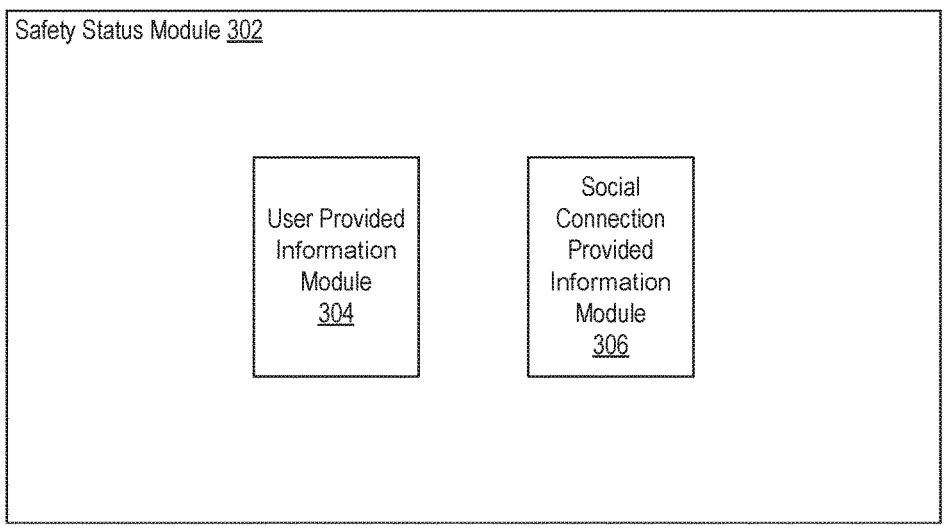
FIG. 3 illustrates an example safety status module configured to facilitate acquiring information during a crisis, according to an embodiment of the present disclosure.

FIG. 3 illustrates an example safety status module 302 configured to facilitate acquiring information during a crisis, according to an embodiment of the present disclosure. In some cases, the example safety status module 302 can be implemented as the example safety status module 108 of FIG. 1. As shown in FIG. 3, the example safety status module 302 can include a user provided information module 304 and a social connection provided information module 306.

As discussed, the safety status module 302 can request, acquire, obtain, or get, etc., information about a safety status of the first user. In some instances, the safety status module 302 can request for the information about the first user's safety status when the crisis is determined to be occurring and when the first user is identified as being (or likely being) within the geographical area affected by the crisis.

The user provided information module 304 can be configured to actively send a request, such as in the form of a message or notification, to the first user when the first user is identified as being, or satisfying a threshold likelihood of being, within the geographical area affected by the crisis. In some implementations, the request can be transmitted by the user provided information module 304 as a website communication, an application communication, a text message, an email message, and/or a telephone communication, etc. In some cases, the request can be transmitted as a push notification. In some instances, one or more of these notifications may be aggregated (e.g., if related) and then sent, or may be sent immediately, depending on which users are involved, a type of crisis, one or more settings, and/or other factors, etc. Moreover, the first user can provide a response to the request, such as by providing information about his or her safety status. In one example, the first user can mark, label, or categorize himself or herself as being safe. In another example, the first user can indicate that he or she is not in the geographical area associated with the crisis. In a further example, the first user can indicate that he or she is not safe and/or needs help. In some cases, the user provided information module 304 can enable the first user to modify the provided information.

Moreover, the social connection provided information module 306 can be configured to acquire information about the first user's safety status from one or more social connections or friends of the first user. In some implementations, when it is determined that the first user is within (or likely within) the geographical area of the crisis, the social connection provided information module 306 can provide an interface for the one or more social connections of the first user to mark, label, or categorize the first user as being safe. In some instances, the social connections can also indicate that the first user is not in the area of the crisis. In some cases, the social connections can also indicate that the first user is not safe and/or needs help.

In some embodiments, the social connection provided information module 306 can notify the first user that the information about the safety status of the first user has been received from the one or more social connections of the first user. The social connection provided information module 306 can further request, from the first user, a confirmation or a non-confirmation for the information about the safety status of the first user. In some cases, the social connection provided information module 306 can also enable the one or more social connections to modify the provided information.

Figure 4:
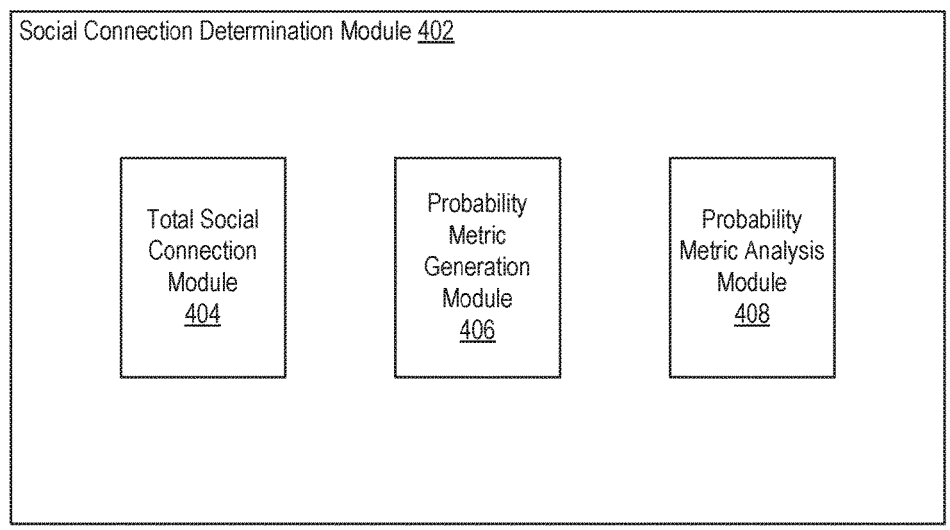
FIG. 4 illustrates an example social connection determination module configured to facilitate acquiring and providing information associated with a crisis, according to an embodiment of the present disclosure.

FIG. 4 illustrates an example social connection determination module 402 configured to facilitate acquiring and providing information associated with a crisis, according to an embodiment of the present disclosure. In some instances, the example social connection determination module 402 can be implemented as the example social connection determination module 110 of FIG. 1. As shown in the example of FIG. 4, in some implementations, the social connection determination module 402 can include a total social connection module 404, a probability metric generation module 406, and a probability metric analysis module 408.

In some embodiments, as discussed previously, the social connection determination module 402 can determine or identify the set of users, partially or entirely, who are associated with the first user. As discussed, the set of users can include at least the second user. The set of users can correspond to social connections or friends of the first user within the social networking system. In one example, an identifier for the first user can be provided to the total social connection module 404, and the total social connection module 404 can provide one or more identifiers for one or more users associated with the first user. In some cases, the total social connection module 404 can work in conjunction with the at least one data store 114 of FIG. 1 to identify the first user's one or more socially connected users.

As discussed above, in some embodiments, the crisis module 102 can identify users within the geographical area of the crisis, request their safety statuses, broadcast/provide their safety statuses, and repeat the process with respect to friends of the identified users (i.e., crawl out). In some implementations, this process can repeat until no users are identified as being within the geographical area, until the crisis ends, and/or until the process is manually stopped.

Moreover, in some embodiments, the crawling process can be expanded to include social connections who are associated with identified users, but who are not within the geographical area. In one example, there can be two different pockets or groups of users within the geographical area of the crisis. The two pockets are connected by a user who is not (currently) in the crisis area and not part of the two pockets. However, in this example, the identified user(s) (e.g., the first user) are in one pocket and not the other, such that the crawling process may not reach the users in the second pocket.

Accordingly, in some implementations, the crawling process can be expanded or made more inclusive. The probability metric generation module 406 can be configured to generate random probability metrics, such as random decimal numbers between 0 and 1. A random probability metric can be used to decide whether or not the crawling process should reach out or crawl to a particular connection who is not in the crisis area but who is associated with an identified user in the crisis area. In some implementations, the probability metric analysis module 408 can determine whether or not the random probability metric at least meets a specified probabilistic threshold level. If the metric meets the threshold level, then the crawling process can continue with respect to the particular connection.

Continuing with the previous example, if the probability metric analysis module 408 determines that a randomly generated probability metric meets the specified threshold level, then the crawling process can reach out to the user who is connected to the first user but who is not within the crisis area and not part of the two pockets. Since the user is associated with another user in the second pocket, the crawling process can crawl to the other user in the second pocket (i.e., second pocket user). Safety status information can be requested from the second pocket user and broadcasted or provided to connections of the second pocket user. The process can repeat for the connections of the second pocket user.

Moreover, in some instances, the specified probabilistic threshold level can be adjustable. This can allow for the expansiveness or aggressiveness of the crawling process to be adjusted when desired.

Figure 5:
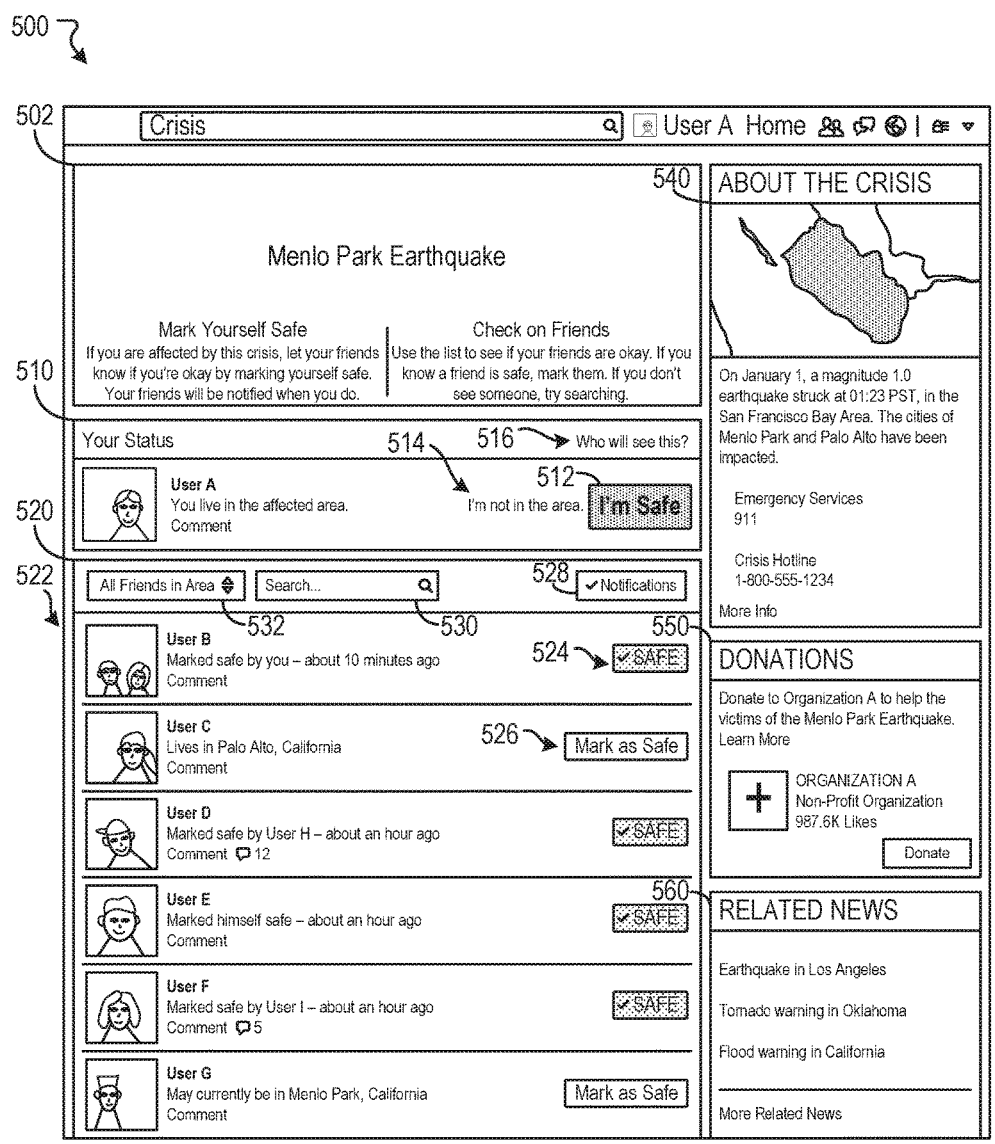
FIG. 5 illustrates an example screenshot associated with acquiring and providing information associated with a crisis, according to an embodiment of the present disclosure.

FIG. 5 illustrates an example screenshot 500 associated with acquiring and providing information associated with a crisis, according to an embodiment of the present disclosure. The example screenshot 500 illustrates an example interface for utilizing various embodiments, components, and/or features of the present disclosure. The example interface can include a first interface portion 502 that provides general information and/or instructions for a user regarding the crisis. The example interface can include a second interface portion 510 that presents a request for safety status information from the user (e.g., User A). The user can input his or her safety status information by interacting with the safety status input element 512. For example, the user can tap on, click, or otherwise engage the input element 512 to indicate that the user is safe. In some cases, the user can also be presented with an option 514 to indicate that he or she is not in the crisis area. In some instances, the user can further be presented with an option 516 to adjust settings regarding who can have access to the user's safety status information. In one example, the default privacy setting is set such that all of the user's social connections or friends can be provided with the user's safety status information (e.g., via notifications, broadcasts, etc.).

Moreover, as shown in the example of FIG. 5, a list 522 of social connections of the user (e.g., User A's friends) can be presented. Respective safety status information for each of the social connections can also be broadcasted, provided, and/or presented to the user. In one example, User B has been marked safe 524 by User A approximately 10 minutes ago. In another example, User C has not yet been marked safe and can be marked safe by User A via input element 526. This can be useful when User A knows that User C is safe, but User C cannot readily indicate so (e.g., no cellular signal, dead batteries, lost computing device, etc.). Moreover, the user can adjust notification settings via the notification element 528. There can also be a search feature 530 for the user to search for users, such that their safety status information can be viewed by the user. Additionally, there can be filtering settings 532 to choose which users are to be presented in the list 522.

Additionally, in the example of FIG. 5, there can be a third interface portion 540 that provide information about the crisis. There can be a fourth interface portion 550 can enables users to make donations. There can also be a fifth interface portion 560 that provides related news. Many variations are possible.

Figure 6:
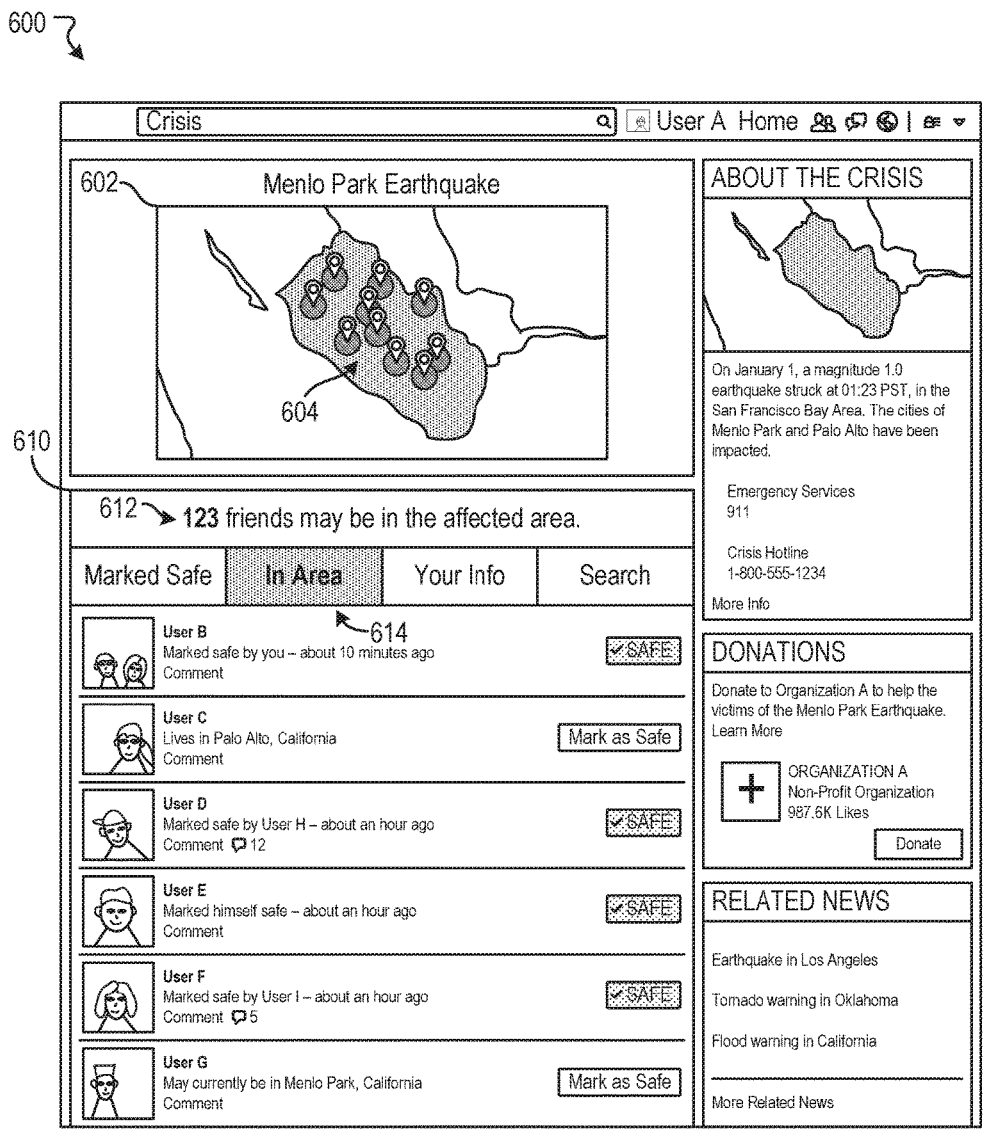
FIG. 6 illustrates an example screenshot associated with acquiring and providing information associated with a crisis, according to an embodiment of the present disclosure.

FIG. 6 illustrates an example screenshot 600 associated with acquiring and providing information associated with a crisis, according to an embodiment of the present disclosure. The example screenshot 600 can show an example interface. In some implementations, the example interface can include a first interface portion 602, which shows a map including a geographical area where the crisis is deemed to be affecting. In some embodiments, one or more map markers 604 can attempt to indicate where one or more social connections of a user (e.g., User A) are located.

In addition, in some embodiments, the example interface can include a second interface portion 610. The second interface portion can indicate a quantity 612 of social connections or friends who may be in the area. Furthermore, in the example of FIG. 6, a currently selected tab 614 can cause the current view of the second interface portion 610 to show which of the user's friends are in the crisis area.

Different views and/or content can be provided via the second interface portion 610 when the user selects different tabs.

Figure 7:
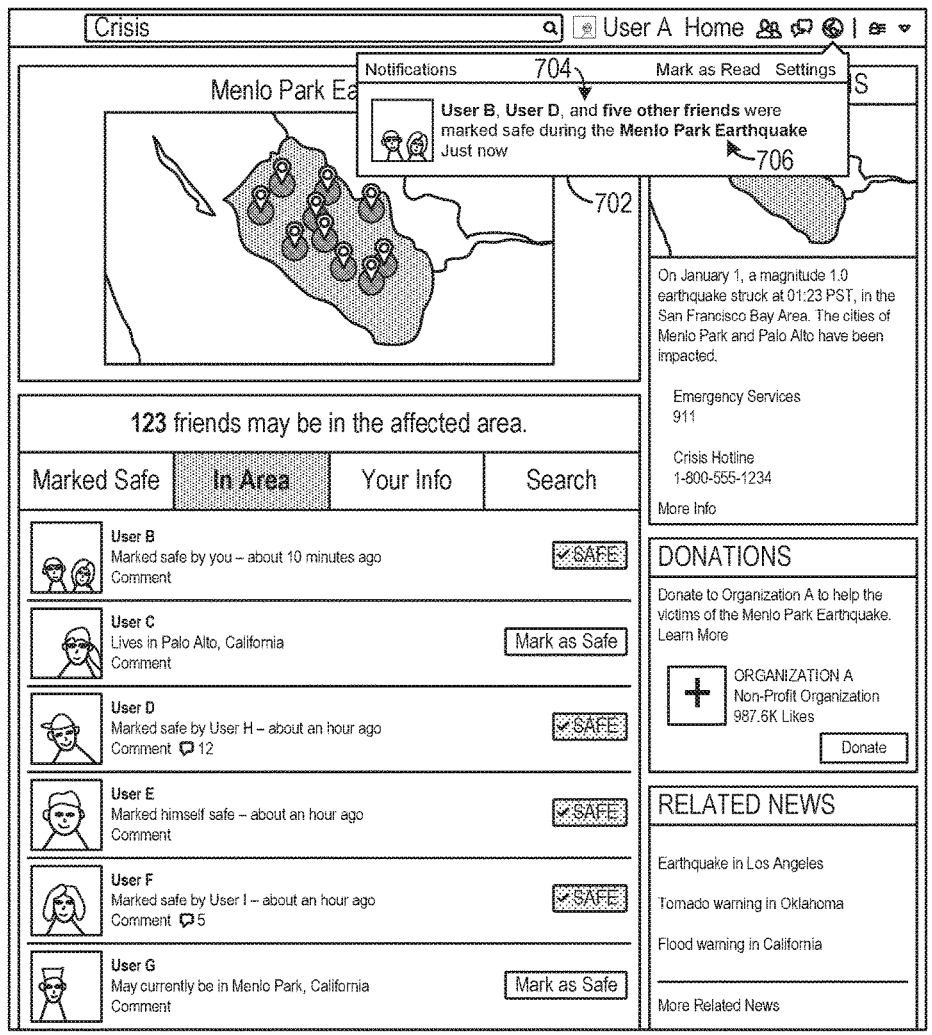
FIG. 7 illustrates an example screenshot associated with acquiring and providing information associated with a crisis, according to an embodiment of the present disclosure.

FIG. 7 illustrates an example screenshot 700 associated with acquiring and providing information associated with a crisis, according to an embodiment of the present disclosure. The example screenshot 700 can show an example notification 702. In some embodiments, the broadcasting or providing of the safety status of a user to one or more social connections or friends associated with the user can include providing a notification to the one or more social connections or friends. In some instances, from the perspective of a recipient of the notification, the notification can indicate the safety status of the user as well as safety statuses of other social connections associated with the recipient.

In some implementations, the example notification 702 can indicate one or more names and/or a quantity 704 of social connections who have been marked safe, during a particular crisis 706.

Figure 8A:
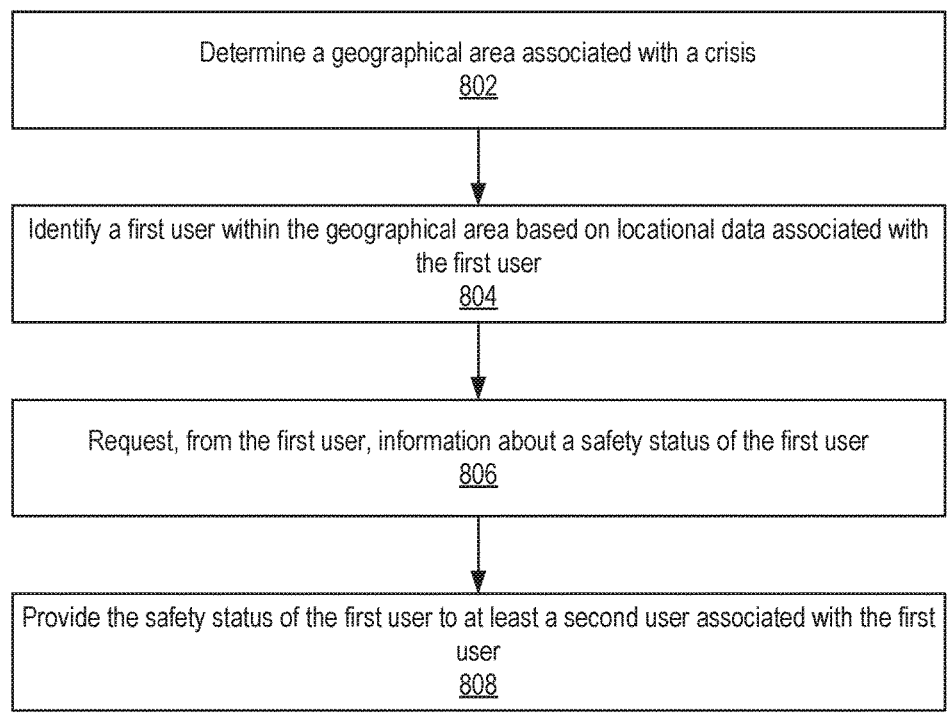
FIG. 8A illustrates an example method associated with acquiring and providing information associated with a crisis, according to an embodiment of the present disclosure.

FIG. 8A illustrates an example method 800 associated with acquiring and providing information associated with a crisis, according to an embodiment of the present disclosure. It should be appreciated that there can be additional, fewer, or alternative steps performed in similar or alternative orders, or in parallel, within the scope of the various embodiments unless otherwise stated.

At block 802, the example method 800 can determine a geographical area associated with a crisis.

At block 804, the example method 800 can identify a first user within the geographical area based on locational data associated with the first user.

At block 806, the example method 800 can request, from the first user, information about a safety status of the first user.

At block 808, the example method 800 can broadcast or provide the safety status of the first user to at least a second user associated with the first user.

In some embodiments, the broadcasting or providing of the safety status of the first user to the at least the second user associated with the first user can further comprise providing a notification to the second user. In some cases, the notification can indicate the safety status of the first user and safety statuses of other social connections associated with the second user.

In some embodiments, the notification can be provided in real-time, at one or more specified time periods, or when an amount of new safety statuses satisfies a threshold amount level.

In some embodiments, the notification can be provided independently of at least one of a location of the second user or the safety status of the second user.

Figure 8B:
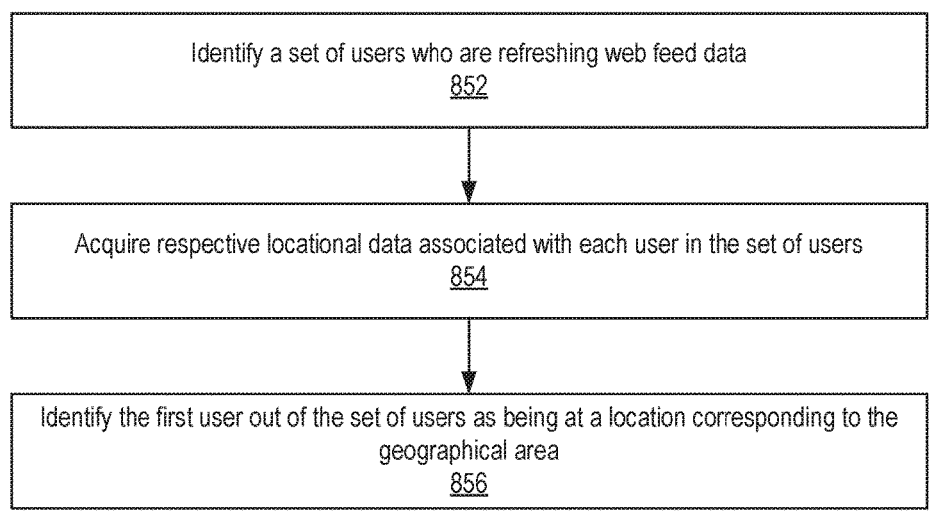
FIG. 8B illustrates an example method associated with acquiring and providing information associated with a crisis, according to an embodiment of the present disclosure.

FIG. 8B illustrates an example method 850 associated with acquiring and providing information associated with a crisis, according to an embodiment of the present disclosure. Again, it should be understood that there can be additional, fewer, or alternative steps performed in similar or alternative orders, or in parallel, within the scope of the various embodiments unless otherwise stated.

At block 852, the example method 850 can identify a set of users who are refreshing web feed data.

At block 854, the example method 850 can acquire respective locational data associated with each user in the set of users.

At block 856, the example method 850 can identify the first user out of the set of users as being at a location corresponding to the geographical area. In some instances, the first user can be identified as being at the location based on the locational data associated with the first user.

In some embodiments, information associated with the crisis can be provided to the first user. In some instances, the information associated with the crisis can correspond to contextual information. In some cases, the information associated with the crisis can include at least one of information about food, information about water, information about shelter, information about evacuation, or a warning associated with the crisis.

In some embodiments, a set of users associated with the first user can be identified. The set of users can include the second user. It can be determined that the second user is within the geographical area. Information about a safety status of the second user can be requested from the second user. The safety status of the second user can be broadcasted or provided to at least a third user associated with the second user.

Again, it is contemplated that there can be many other uses, applications, and/or variations associated with the various embodiments of the present disclosure. For example, various embodiments of the present disclosure can learn, improve, and/or be refined over time. In another example, various embodiment can be utilized for a crisis that is not necessarily geographically localized, such as a food safety crisis. In this example, it can be determined that the crisis is associated with a particular common subject, such as a particular restaurant, a particular restaurant chain, and/or other common factors (e.g., workplace, organization, etc.).

Social Networking System—Example Implementation

Figure 9:
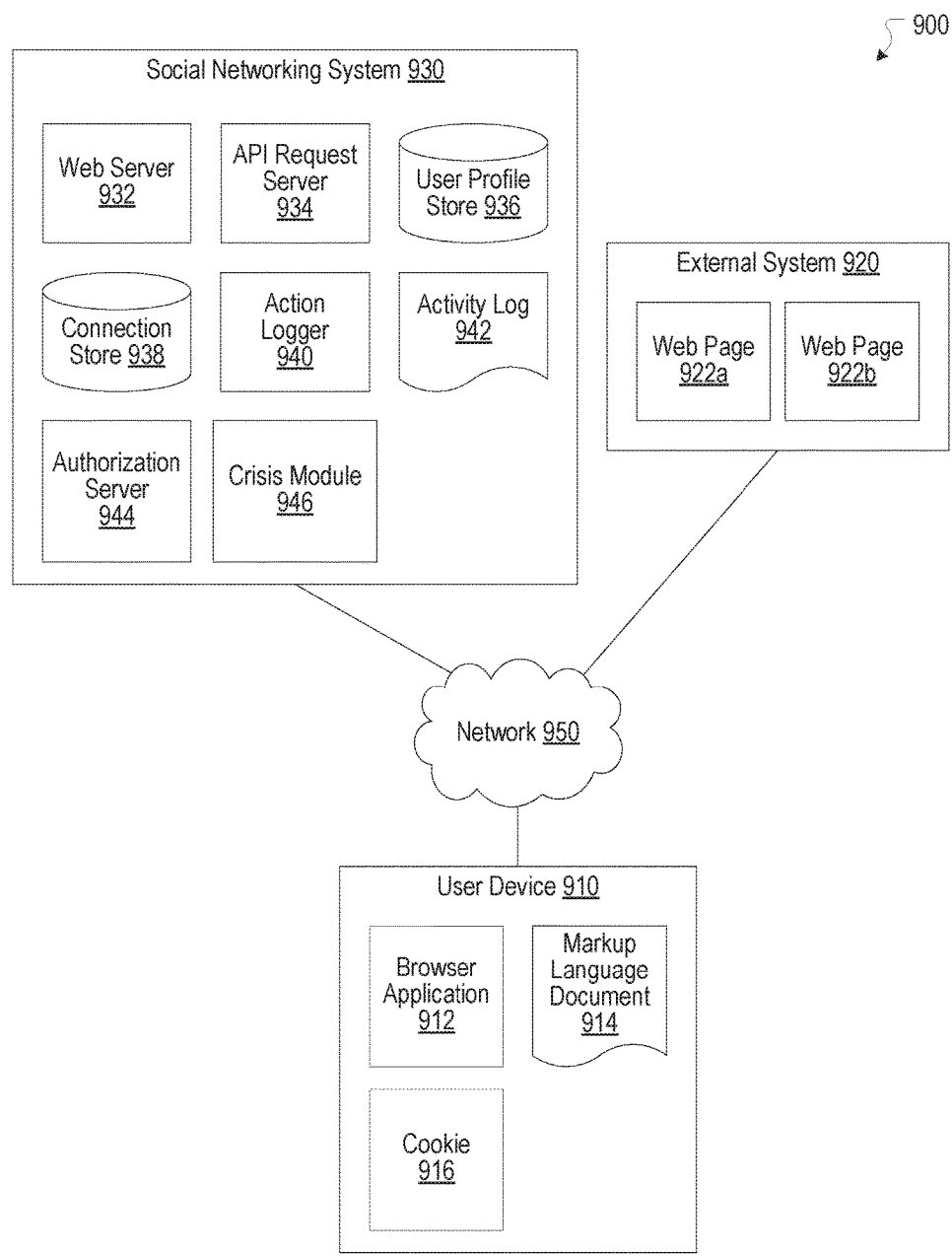
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a crisis module 946. The crisis module 946 can, for example, be implemented as the crisis module 102 of FIG. 1. The crisis module 946 can be configured to determine a geographical area associated with a crisis. The crisis module 946 can be configured to identify a first user within the geographical area based on locational data associated with the first user. Further, the crisis module 946 can be configured to actively request or acquire, from the first user, information about a safety status of the first user. The crisis module 946 can also be configured to broadcast, communicate, or provide the safety status of the first user to at least a second user associated with the first user. Other features of the crisis module 946 are discussed herein in connection with the crisis module 102.

Hardware Implementation

Figure 10:
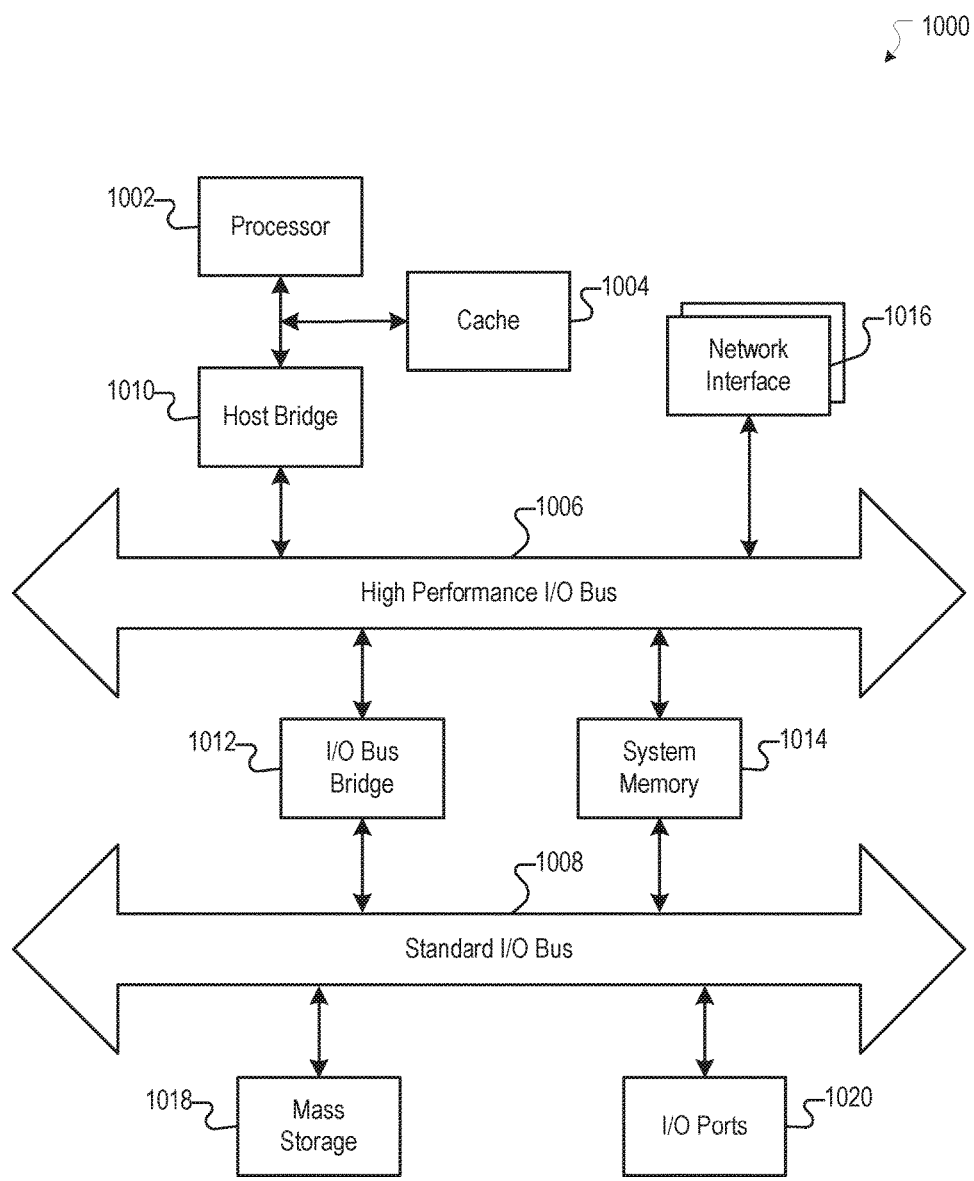
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    identifying, by a computing system, in a crawl process a first user and a connected user associated with the first user within a geographical area associated with a crisis;
    requesting, by the computing system, a safety status of the connected user within the geographical area;
    providing, by the computing system, the safety status of the connected user within the geographical area through at least a portion of a network;
    generating, by the computing system, a probability metric relating to potential expansion of the crawl process to a connection who is not within the geographical area associated with the crisis but who is connected to the connected user; and
    based on satisfaction by the probability metric of a threshold, expanding, by the computing system, the crawl process to the connection not within the geographical area so that the safety status of the connection is requested and broadcasted.

2. The computer-implemented method of claim 1, wherein the connected user within the geographical area is associated with a first pocket of persons in the geographical area.

3. The computer-implemented method of claim 2, wherein the connection is connected to a second pocket of persons in the geographical area that is not connected through the geographical area to the first pocket of persons.

4. The computer-implemented method of claim 3, wherein the second pocket of persons includes a second user, the method further comprising:
    requesting a safety status of the second user; and providing the safety status of the second user through at least a portion of the network.

5. The computer-implemented method of claim 1, further comprising:
   generating a second probability metric associated with a second connection of the connected user, the second connection not within the geographical area associated with the crisis;
   not expanding the crawl process to the second connection not within the geographical area based on non-satisfaction by the second probability metric of the threshold.

6. The computer-implemented method of claim 1, wherein the probability metric is a random probability metric.

7. The computer-implemented method of claim 6, wherein the random probability metric is a decimal value between zero and 1.

8. The computer-implemented method of claim 1, wherein the threshold is an adjustable probabilistic threshold level associated with expansiveness of the crawl process.

9. The computer-implemented method of claim 1, wherein the identifying the first user and the connected user comprises determining a set of users including the first user and the connected user who are refreshing feed data.

10. The computer-implemented method of claim 1, wherein the geographical area includes at least one of a district, a zip code area, a city, a county, a region, a state, a province, and a country.

11. A system comprising:
   at least one processor; and
   a memory storing instructions that, when executed by the at least one processor, cause the system to perform:
   identifying in a crawl process a first user and a connected user associated with the first user within a geographical area associated with a crisis;
   requesting a safety status of the connected user within the geographical area;
   providing the safety status of the connected user within the geographical area through at least a portion of a network;
   generating a probability metric relating to potential expansion of the crawl process to a connection who is not within the geographical area associated with the crisis but who is connected to the connected user; and
   based on satisfaction by the probability metric of a threshold, expanding the crawl process to the connection not within the geographical area so that the safety status of the connection is requested and broadcasted.

12. The system of claim 11, wherein the connected user within the geographical area is associated with a first pocket of persons in the geographical area.

13. The system of claim 12, wherein the connection is connected to a second pocket of persons in the geographical area that is not connected through the geographical area to the first pocket of persons.

14. The system of claim 11, wherein the probability metric is a random probability metric.

15. The system of claim 11, the identifying the first user and the connected user comprises determining a set of users including the first user and the connected user who are refreshing feed data.

16. A non-transitory computer-readable storage medium including instructions that, when executed by at least one processor of a computing system, cause the computing system to perform:
   identifying in a crawl process a first user and a connected user associated with the first user within a geographical area associated with a crisis;
   requesting a safety status of the connected user within the geographical area;
   providing the safety status of the connected user within the geographical area through at least a portion of a network;
   generating a probability metric relating to potential expansion of the crawl process to a connection who is not within the geographical area associated with the crisis but who is connected to the connected user; and
   based on satisfaction by the probability metric of a threshold, expanding the crawl process to the connection not within the geographical area so that the safety status of the connection is requested and broadcasted.

17. The non-transitory computer-readable storage medium of claim 16, wherein the connected user within the geographical area is associated with a first pocket of persons in the geographical area.

18. The non-transitory computer-readable storage medium of claim 17, wherein the connection is connected to a second pocket of persons in the geographical area that is not connected through the geographical area to the first pocket of persons.

19. The non-transitory computer-readable storage medium of claim 16, wherein the probability metric is a random probability metric.

20. The non-transitory computer-readable storage medium of claim 16, the identifying the first user and the connected user comprises determining a set of users including the first user and the connected user who are refreshing feed data.

* * * * *